(12) United States Patent
Srinivasulu

(10) Patent No.: US 11,924,303 B2
(45) Date of Patent: ***Mar. 5, 2024

(54) SYSTEMS AND METHODS FOR DYNAMIC TELEMATICS MESSAGING

(71) Applicant: CalAmp Corp., Irvine, CA (US)

(72) Inventor: Santhosh Srinivasulu, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,318

(22) Filed: Mar. 18, 2022

(65) Prior Publication Data

US 2022/0210240 A1 Jun. 30, 2022

Related U.S. Application Data

(63) Continuation of application No. 16/883,648, filed on May 26, 2020, now Pat. No. 11,290,556, which is a
(Continued)

(51) Int. Cl.
*H04L 67/565* (2022.01)
*G07C 5/00* (2006.01)
(Continued)

(52) U.S. Cl.
CPC ............ *H04L 67/565* (2022.05); *G07C 5/008* (2013.01); *G07C 5/0808* (2013.01); *H04L 67/12* (2013.01);
(Continued)

(58) Field of Classification Search
None
See application file for complete search history.

(56) References Cited

U.S. PATENT DOCUMENTS

| 4,497,025 A | 1/1985 | Hannoyer |
| 4,549,277 A | 10/1985 | Brunson et al. |

(Continued)

FOREIGN PATENT DOCUMENTS

| EP | 2056298 A1 | 5/2009 |
| EP | 2083276 A1 | 7/2009 |

(Continued)

OTHER PUBLICATIONS

Examination Report for Application No. GB2008519.7, dated Sep. 20, 2021, 2 pages.

(Continued)

*Primary Examiner* — Scott B Christensen
(74) *Attorney, Agent, or Firm* — Barnes & Thornburg LLP

(57) ABSTRACT

Systems and methods for dynamic telematics messaging in accordance with embodiments of the invention are disclosed. One embodiment includes a dynamic telematics messaging system includes at least one vehicle telematics device, and a dynamic telematics messaging server system including, at least one processor, and a memory containing a messaging application, wherein the messaging application directs the at least one processor to, obtain a first message data from the at least one vehicle telematics device encoded in a first message format, transcode the first message data into a second message format, process the transcoded message data, and provide the transcoded message data.

20 Claims, 10 Drawing Sheets

Related U.S. Application Data continuation of application No. 15/818,260, filed on Nov. 20, 2017, now abandoned.

(60) Provisional application No. 62/582,192, filed on Nov. 6, 2017.

(51) Int. Cl.
| | |
|---|---|
| *G07C 5/08* | (2006.01) |
| *H04L 9/40* | (2022.01) |
| *H04L 67/12* | (2022.01) |
| *H04L 69/40* | (2022.01) |
| *H04W 4/44* | (2018.01) |
| *H04W 12/08* | (2021.01) |

(52) U.S. Cl.
CPC .............. *H04L 69/40* (2013.01); *H04W 4/44* (2018.02); *H04L 63/10* (2013.01); *H04L 63/102* (2013.01); *H04W 12/08* (2013.01)

(56) References Cited

U.S. PATENT DOCUMENTS

| | | |
|---|---|---|
| 5,058,020 A | 10/1991 | Matsuda |
| 5,117,375 A | 5/1992 | Worcester et al. |
| 5,251,161 A | 10/1993 | Gioutsos et al. |
| 5,253,173 A | 10/1993 | Drobny et al. |
| 5,337,238 A | 8/1994 | Gioutsos et al. |
| 5,339,242 A | 8/1994 | Jensen et al. |
| 5,519,613 A | 5/1996 | Gioutsos et al. |
| 5,559,699 A | 9/1996 | Gioutsos et al. |
| 5,563,791 A | 10/1996 | Gioutsos et al. |
| 5,587,906 A | 12/1996 | Muckley et al. |
| 5,588,005 A | 12/1996 | Ali et al. |
| 5,684,701 A | 11/1997 | Breed et al. |
| 5,754,115 A | 5/1998 | Woo |
| 5,754,849 A | 5/1998 | Dyer et al. |
| 5,758,301 A | 5/1998 | Saito et al. |
| 5,767,766 A | 6/1998 | Kwun |
| 5,780,782 A | 7/1998 | O'Dea et al. |
| 5,805,460 A | 9/1998 | Greene et al. |
| 5,825,283 A | 10/1998 | Camhi |
| 5,841,201 A | 11/1998 | Ibaraki et al. |
| 5,862,511 A | 1/1999 | Croyle et al. |
| 5,874,675 A | 2/1999 | Edmans et al. |
| 6,029,111 A | 2/2000 | Croyle |
| 6,076,028 A | 6/2000 | Donnelly et al. |
| 6,085,151 A | 7/2000 | Farmer et al. |
| 6,163,690 A | 12/2000 | Lilja |
| 6,236,921 B1 | 5/2001 | McConnell |
| 6,269,290 B1 | 7/2001 | Tsuji et al. |
| 6,308,134 B1 | 10/2001 | Croyle et al. |
| 6,337,653 B1 | 1/2002 | Buchler et al. |
| 6,346,876 B1 | 2/2002 | Flick |
| 6,356,841 B1 | 3/2002 | Hamrick et al. |
| 6,363,308 B1 | 3/2002 | Petti et al. |
| 6,392,527 B1 | 5/2002 | Gilano et al. |
| 6,401,027 B1 | 6/2002 | Xu et al. |
| 6,417,802 B1 | 7/2002 | Diesel |
| 6,431,593 B1 | 8/2002 | Cooper et al. |
| 6,438,475 B1 | 8/2002 | Gioutsos et al. |
| 6,532,419 B1 | 3/2003 | Begin |
| 6,540,255 B1 | 4/2003 | Garcia et al. |
| 6,611,755 B1 | 8/2003 | Coffee et al. |
| 6,737,989 B2 | 5/2004 | Flick |
| 6,756,885 B1 | 6/2004 | Flick |
| 6,812,888 B2 | 11/2004 | Drury et al. |
| 6,832,140 B2 | 12/2004 | Fan et al. |
| 6,850,839 B1 | 2/2005 | Mcgibney |
| 6,912,557 B1 | 6/2005 | North et al. |
| 7,015,830 B2 | 3/2006 | Flick |
| 7,020,501 B1 | 3/2006 | Elliott et al. |
| 7,050,897 B2 | 5/2006 | Breed et al. |
| 7,085,637 B2 | 8/2006 | Breed et al. |
| 7,110,880 B2 | 9/2006 | Breed et al. |
| 7,158,016 B2 | 1/2007 | Cuddihy et al. |
| 7,250,850 B2 | 7/2007 | Mizutani |
| 7,272,493 B1 | 9/2007 | Hamrick et al. |
| 7,286,929 B2 | 10/2007 | Staton et al. |
| 7,348,895 B2 | 3/2008 | Lagassey et al. |
| 7,366,608 B2 | 4/2008 | Hamrick et al. |
| 7,460,954 B2 | 12/2008 | Hamrick et al. |
| 7,484,756 B2 | 2/2009 | Chou et al. |
| 7,527,288 B2 | 5/2009 | Breed et al. |
| 7,577,525 B2 | 8/2009 | Hamrick et al. |
| 7,607,510 B1 | 10/2009 | Mun et al. |
| 7,643,919 B2 | 1/2010 | Nicaise |
| 7,660,652 B2 | 2/2010 | Smith et al. |
| 7,671,727 B2 | 3/2010 | Flick |
| 7,725,218 B2 | 5/2010 | Hamrick et al. |
| 7,765,039 B1 | 7/2010 | Hagenbuch |
| 7,767,766 B2 | 8/2010 | Tilbrook |
| 7,805,231 B2 | 9/2010 | Cluff et al. |
| 7,805,276 B1 | 9/2010 | Byers et al. |
| 8,004,397 B2 | 8/2011 | Forrest et al. |
| 8,010,251 B2 | 8/2011 | Hamrick et al. |
| 8,032,278 B2 | 10/2011 | Flick |
| 8,065,342 B1* | 11/2011 | Borg .................. G06Q 10/0631 |
| | | 455/566 |
| 8,155,841 B2 | 4/2012 | Erb |
| 8,330,626 B1 | 12/2012 | Adelson |
| 8,489,271 B2 | 7/2013 | Hergesheimer et al. |
| 8,635,091 B2 | 1/2014 | Amigo et al. |
| 8,688,380 B2 | 4/2014 | Cawse et al. |
| 8,749,350 B2 | 6/2014 | Geisler et al. |
| 8,762,009 B2 | 6/2014 | Ehrman et al. |
| 8,812,173 B2 | 8/2014 | Chen et al. |
| 8,855,143 B1 | 10/2014 | Acampora |
| 8,874,279 B2 | 10/2014 | Frye et al. |
| 8,996,240 B2 | 3/2015 | Plante |
| 9,002,538 B2 | 4/2015 | Hergesheimer et al. |
| 9,171,460 B2 | 10/2015 | Chen |
| 9,179,497 B1 | 11/2015 | Teixeira et al. |
| 9,217,757 B2 | 12/2015 | Hergesheimer et al. |
| 9,406,222 B2 | 8/2016 | Hergesheimer et al. |
| 9,459,277 B2 | 10/2016 | Hergesheimer et al. |
| 9,491,420 B2 | 11/2016 | Mimar |
| 9,644,977 B2 | 5/2017 | Camisa |
| 9,648,579 B2 | 5/2017 | Abhishek |
| 10,219,117 B2 | 2/2019 | Hergesheimer et al. |
| 2002/0065045 A1 | 5/2002 | Kim et al. |
| 2002/0100310 A1 | 8/2002 | Beoin |
| 2002/0124166 A1 | 9/2002 | Lee et al. |
| 2002/0135167 A1 | 9/2002 | Mattes et al. |
| 2003/0001368 A1 | 1/2003 | Breed et al. |
| 2003/0005117 A1 | 1/2003 | Kano et al. |
| 2003/0028766 A1 | 2/2003 | Gass et al. |
| 2003/0083079 A1* | 5/2003 | Clark ............... G08G 1/096716 |
| | | 455/466 |
| 2003/0121027 A1 | 6/2003 | Hines |
| 2003/0151507 A1 | 8/2003 | Andre et al. |
| 2003/0176959 A1 | 9/2003 | Breed et al. |
| 2003/0236970 A1 | 12/2003 | Palmer et al. |
| 2004/0036261 A1 | 2/2004 | Breed et al. |
| 2004/0075539 A1 | 4/2004 | Savoie et al. |
| 2004/0088090 A1 | 5/2004 | Wee |
| 2004/0132500 A1 | 7/2004 | Rogalski et al. |
| 2004/0142659 A1 | 7/2004 | Oesterling |
| 2004/0155790 A1 | 8/2004 | Tsuji et al. |
| 2004/0171378 A1 | 9/2004 | Rautila et al. |
| 2004/0257208 A1 | 12/2004 | Huang et al. |
| 2005/0065711 A1 | 3/2005 | Dahlgren et al. |
| 2005/0071314 A1 | 3/2005 | Caron |
| 2005/0099289 A1 | 5/2005 | Arita et al. |
| 2005/0240343 A1 | 10/2005 | Schmidt et al. |
| 2005/0267947 A1 | 12/2005 | Patrick et al. |
| 2005/0273516 A1 | 12/2005 | Patrick et al. |
| 2005/0283286 A1 | 12/2005 | Kanda et al. |
| 2006/0022469 A1 | 2/2006 | Syed et al. |
| 2006/0031432 A1 | 2/2006 | Patrick et al. |
| 2006/0034237 A1 | 2/2006 | Patrick et al. |
| 2006/0041336 A1 | 2/2006 | Schubert et al. |
| 2006/0047459 A1 | 3/2006 | Underbrink et al. |
| 2006/0050953 A1 | 3/2006 | Farmer et al. |

(56) References Cited

U.S. PATENT DOCUMENTS

| | | |
|---|---|---|
| 2006/0074621 A1 | 4/2006 | Rachman |
| 2006/0161840 A1* | 7/2006 | Cohen .................. G06F 40/151 |
| | | 705/3 |
| 2006/0199537 A1 | 9/2006 | Eisenbach et al. |
| 2007/0027612 A1 | 2/2007 | Barfoot et al. |
| 2007/0038653 A1 | 2/2007 | Li et al. |
| 2007/0109117 A1 | 5/2007 | Heitzmann et al. |
| 2007/0229251 A1 | 10/2007 | Ehrman et al. |
| 2007/0257791 A1 | 11/2007 | Arita et al. |
| 2007/0266078 A1 | 11/2007 | Rittle et al. |
| 2007/0271014 A1 | 11/2007 | Breed |
| 2007/0299587 A1 | 12/2007 | Breed et al. |
| 2008/0043821 A1 | 2/2008 | Brockhage et al. |
| 2008/0111666 A1 | 5/2008 | Plante et al. |
| 2008/0114545 A1 | 5/2008 | Takaoka et al. |
| 2008/0128600 A1 | 6/2008 | Ogisu et al. |
| 2008/0150707 A1 | 6/2008 | Shamoto |
| 2008/0195261 A1 | 8/2008 | Breed |
| 2008/0202199 A1 | 8/2008 | Finley et al. |
| 2008/0211666 A1 | 9/2008 | Saidi et al. |
| 2008/0211914 A1 | 9/2008 | Herrera et al. |
| 2008/0228976 A1 | 9/2008 | Wei et al. |
| 2008/0275601 A1 | 11/2008 | Saito et al. |
| 2008/0281618 A1 | 11/2008 | Mermet et al. |
| 2009/0015392 A1 | 1/2009 | Takahashi et al. |
| 2009/0037056 A1 | 2/2009 | Erb |
| 2009/0077229 A1 | 3/2009 | Ebbs |
| 2009/0177350 A1 | 7/2009 | Williams et al. |
| 2009/0217163 A1 | 8/2009 | Jaroker |
| 2009/0217733 A1 | 9/2009 | Stachow |
| 2009/0221320 A1 | 9/2009 | Walley et al. |
| 2009/0249858 A1 | 10/2009 | Ishikawa et al. |
| 2010/0039216 A1 | 2/2010 | Knight et al. |
| 2010/0039247 A1 | 2/2010 | Ziegler et al. |
| 2010/0039318 A1 | 2/2010 | Kmiecik et al. |
| 2010/0042286 A1 | 2/2010 | Lich |
| 2010/0097316 A1 | 4/2010 | Shaw et al. |
| 2010/0122246 A1 | 5/2010 | Gesquiere et al. |
| 2010/0185524 A1 | 7/2010 | Watkins |
| 2010/0205427 A1 | 8/2010 | Bauer et al. |
| 2010/0231002 A1 | 9/2010 | Yoshioka et al. |
| 2010/0235433 A1 | 9/2010 | Ansari et al. |
| 2010/0241838 A1 | 9/2010 | Cohen et al. |
| 2010/0273422 A1 | 10/2010 | Garrett et al. |
| 2010/0279647 A1 | 11/2010 | Jacobs et al. |
| 2010/0312473 A1 | 12/2010 | Hoshizaki |
| 2010/0318257 A1 | 12/2010 | Kalinadhabhotla |
| 2011/0004444 A1 | 1/2011 | Farrow et al. |
| 2011/0037561 A1 | 2/2011 | True et al. |
| 2011/0053575 A1 | 3/2011 | Veliu et al. |
| 2011/0060496 A1 | 3/2011 | Nielsen et al. |
| 2011/0071971 A1 | 3/2011 | Parks et al. |
| 2011/0106373 A1 | 5/2011 | Hergesheimer et al. |
| 2011/0109438 A1 | 5/2011 | Dijkstra et al. |
| 2011/0130906 A1 | 6/2011 | Mayer |
| 2011/0153367 A1 | 6/2011 | Amigo |
| 2011/0202225 A1 | 8/2011 | Willis et al. |
| 2011/0202305 A1 | 8/2011 | Willis et al. |
| 2011/0218710 A1 | 9/2011 | Trinh et al. |
| 2011/0238289 A1 | 9/2011 | Lehmann et al. |
| 2011/0264393 A1 | 10/2011 | An |
| 2011/0320088 A1 | 12/2011 | Eom et al. |
| 2012/0022780 A1 | 1/2012 | Kulik et al. |
| 2012/0035881 A1 | 2/2012 | Rubin |
| 2012/0041618 A1 | 2/2012 | Sun et al. |
| 2012/0050095 A1 | 3/2012 | Scherzinger |
| 2012/0072078 A1 | 3/2012 | Oosaki et al. |
| 2012/0116669 A1 | 5/2012 | Lee |
| 2012/0155389 A1 | 6/2012 | Mcnamee et al. |
| 2012/0158211 A1 | 6/2012 | Chen et al. |
| 2012/0159142 A1 | 6/2012 | Jibbe et al. |
| 2012/0231821 A1 | 9/2012 | Swanson |
| 2012/0233237 A1 | 9/2012 | Roa et al. |
| 2012/0233668 A1 | 9/2012 | Leafe et al. |
| 2012/0253551 A1 | 10/2012 | Halimi et al. |
| 2012/0253585 A1 | 10/2012 | Harvie |
| 2012/0253892 A1 | 10/2012 | Davidson |
| 2012/0259526 A1 | 10/2012 | Inoue |
| 2012/0303203 A1 | 11/2012 | Olsen et al. |
| 2012/0331181 A1 | 12/2012 | Govande et al. |
| 2013/0002415 A1 | 1/2013 | Walli |
| 2013/0007245 A1* | 1/2013 | Malik .................. H04L 41/0816 |
| | | 709/223 |
| 2013/0013907 A1 | 1/2013 | Marino et al. |
| 2013/0024202 A1 | 1/2013 | Harris |
| 2013/0030811 A1 | 1/2013 | Olleon et al. |
| 2013/0038439 A1 | 2/2013 | Saito et al. |
| 2013/0073142 A1 | 3/2013 | Hergesheimer et al. |
| 2013/0080542 A1 | 3/2013 | Peng et al. |
| 2013/0095841 A1 | 4/2013 | Quimby et al. |
| 2013/0148554 A1 | 6/2013 | Chen et al. |
| 2013/0163584 A1 | 6/2013 | Jayaraman et al. |
| 2013/0182693 A1 | 7/2013 | Sperling et al. |
| 2013/0204572 A1 | 8/2013 | Sato |
| 2013/0244210 A1 | 9/2013 | Nath et al. |
| 2013/0249713 A1 | 9/2013 | Adelson |
| 2013/0275001 A1 | 10/2013 | Hergesheimer et al. |
| 2013/0288659 A1 | 10/2013 | Hrabak et al. |
| 2013/0297137 A1 | 11/2013 | Fushiki et al. |
| 2013/0302756 A1 | 11/2013 | Takeuchi |
| 2013/0320654 A1 | 12/2013 | Clark et al. |
| 2013/0325250 A1* | 12/2013 | Cawse .................. G07C 5/0808 |
| | | 701/33.1 |
| 2013/0338855 A1 | 12/2013 | Mason |
| 2014/0069837 A1 | 3/2014 | Naruishi et al. |
| 2014/0074315 A1 | 3/2014 | Frye et al. |
| 2014/0074353 A1 | 3/2014 | Lee et al. |
| 2014/0094210 A1 | 4/2014 | Gellens et al. |
| 2014/0095211 A1 | 4/2014 | Gloerstad et al. |
| 2014/0111354 A1 | 4/2014 | Hergesheimer et al. |
| 2014/0118132 A1 | 5/2014 | Braunberger et al. |
| 2014/0142886 A1 | 5/2014 | Hergesheimer et al. |
| 2014/0143940 A1 | 5/2014 | Juliano et al. |
| 2014/0149145 A1 | 5/2014 | Peng |
| 2014/0173581 A1 | 6/2014 | Grinberg et al. |
| 2014/0180529 A1 | 6/2014 | Simon et al. |
| 2014/0189335 A1 | 7/2014 | Liu et al. |
| 2014/0236518 A1 | 8/2014 | Hergesheimer et al. |
| 2014/0236519 A1 | 8/2014 | Hergesheimer et al. |
| 2014/0237463 A1 | 8/2014 | Sriram et al. |
| 2014/0300739 A1 | 10/2014 | Mimar |
| 2014/0303836 A1 | 10/2014 | Phelan et al. |
| 2014/0309843 A1 | 10/2014 | Chen et al. |
| 2014/0357295 A1 | 12/2014 | Skomra et al. |
| 2014/0358394 A1 | 12/2014 | Picciotti |
| 2014/0379208 A1 | 12/2014 | McQuade et al. |
| 2015/0015385 A1 | 1/2015 | Tomita et al. |
| 2015/0051796 A1 | 2/2015 | Levy |
| 2015/0105099 A1 | 4/2015 | Luo et al. |
| 2015/0161391 A1 | 6/2015 | Johnsen et al. |
| 2015/0248731 A1 | 9/2015 | Fernandes et al. |
| 2015/0268059 A1* | 9/2015 | Borghesani ............ G07C 5/008 |
| | | 701/32.3 |
| 2015/0271271 A1 | 9/2015 | Bullotta et al. |
| 2015/0271299 A1 | 9/2015 | Bullotta et al. |
| 2015/0339241 A1 | 11/2015 | Warner et al. |
| 2016/0094964 A1 | 3/2016 | Barfield et al. |
| 2016/0104123 A1 | 4/2016 | Viswanath |
| 2016/0133130 A1 | 5/2016 | Grimm et al. |
| 2016/0146615 A1 | 5/2016 | Abhishek |
| 2016/0162284 A1 | 6/2016 | Meng et al. |
| 2016/0173281 A1 | 6/2016 | White et al. |
| 2016/0335813 A1 | 11/2016 | Hergesheimer et al. |
| 2016/0341559 A1 | 11/2016 | Camisa |
| 2016/0362075 A1 | 12/2016 | Dlagnekov |
| 2017/0023610 A1 | 1/2017 | Hergesheimer et al. |
| 2017/0075835 A1 | 3/2017 | Langer |
| 2017/0144331 A1 | 5/2017 | Liem et al. |
| 2017/0236339 A1 | 8/2017 | Camisa |
| 2018/0012429 A1 | 1/2018 | Jenkins et al. |
| 2018/0053354 A1 | 2/2018 | Jenkins et al. |
| 2018/0103355 A1 | 4/2018 | Hergesheimer et al. |

(56) References Cited

U.S. PATENT DOCUMENTS

| | | | |
|---|---|---|---|
| 2018/0164401 | A1 | 6/2018 | Hergesheimer |
| 2019/0140886 | A1 | 5/2019 | Zywicki et al. |
| 2019/0281428 | A1 | 9/2019 | Hergesheimer et al. |

FOREIGN PATENT DOCUMENTS

| | | |
|---|---|---|
| EP | 2923277 B1 | 9/2017 |
| GB | 2506365 A | 4/2014 |
| JP | 2007178295 A | 7/2007 |
| KR | 2009097547 A | 9/2009 |
| WO | 2000017607 | 3/2000 |
| WO | 2002018873 | 3/2002 |
| WO | 2013076695 A1 | 5/2013 |
| WO | 2014049352 A1 | 4/2014 |
| WO | 2014081485 | 5/2014 |
| WO | 2014130077 A1 | 8/2014 |
| WO | 2014130078 A1 | 8/2014 |
| WO | 2014202110 A1 | 12/2014 |
| WO | 2015121639 A1 | 8/2015 |
| WO | 2015183677 A1 | 12/2015 |
| WO | 2016081901 | 5/2016 |
| WO | 2016191306 | 12/2016 |
| WO | 2016200589 | 12/2016 |
| WO | 2018035065 A1 | 2/2018 |
| WO | 2019090366 A1 | 5/2019 |
| WO | 2019094988 A1 | 5/2019 |

OTHER PUBLICATIONS

International Search Report and Written Opinion for International Application No. PCT/US2018/061648, Search completed Feb. 12, 2019, dated Apr. 15, 2019, 14 pgs.
International Search Report and Written Opinion for International Application No. PCT/US2018/061650, Search completed Feb. 17, 2019, dated Mar. 25, 2019, 17 pgs.
International Preliminary Report on Patentability for International Application PCT/US2016/033621, Report dated Nov. 28, 2017, dated Dec. 7, 2017, 7 Pgs.
International Search Report and Written Opinion for International Application No. PCT/US2017/040763, Search completed Aug. 22, 2017, dated Sep. 8, 2017, 15 Pgs.
Extended European Search Report for European Application No. 17160719.5, Search completed Apr. 6, 2017, dated Apr. 18, 2017, 6 Pgs.
Extended European Search Report for European Application No. 13875911.3, Search completed Nov. 22, 2016, dated Dec. 9, 2016, 6 Pgs.
Extended European Search Report for European Application No. 13875407.2, Search completed Nov. 22, 2016, dated Nov. 30, 2016, 7 Pgs.
International Search Report and Written Opinion for International Application No. PCT/US2016/033625, Search completed Jul. 19, 2016, dated Aug. 18, 2016, 7 Pgs.
International Search Report and Written Opinion for International Application No. PCT/US2016/033621, completed Jul. 28, 2016, dated Aug. 5, 2016, 11 Pgs.
International Search Report and Written Opinion for International Application No. PCT/US2015/061990, completed Jan. 12, 2016, dated Feb. 4, 2016, 6 Pgs.
International Preliminary Report on Patentability for International Application PCT/US2013/054939, dated Aug. 25, 2015, dated Sep. 3, 2015, 4 Pgs.
International Preliminary Report on Patentability for International Application PCT/US2013/054943, dated Aug. 25, 2015, dated Sep. 3, 2015, 6 Pgs.
International Preliminary Report on Patentability for International Application PCT/US2013/054956, Report dated May 26, 2015, dated Jun. 4, 2015, 9 Pgs.
International Search Report and Written Opinion for International Application No. PCT/US2013/054956, International Filing Date Aug. 14, 2013, Search Completed Feb. 11, 2014, dated Mar. 6, 2014, 9 pgs.
International Search Report and Written Opinion for International Application No. PCT/US13/54943, Completed Feb. 13, 2014, dated Feb. 27, 2014, 6 pgs.
International Search Report and Written Opinion for International Application No. PCT/US13/54939, Completed Feb. 5, 2014, dated Feb. 24, 2014, 5 pgs.
Memsic 2125 Dual-Axis Accelerometer (#28017) Data Sheet (Parallax Inc., v2.0 Jan. 29, 2009).
ETSI, GSM Technical Specification, GSM 07.07, Version 5.0.0, Jul. 1996, 77 pgs.
Road vehicles—Diagnostic Systems—Part 2: CARB requirements for interchange of digital information, ISO 9141-2, Feb. 1, 1994, 18 pgs.
Surface Vehicle Recommended Practice, Universal Interface for OBD II Scan, SAE Standard J2201, Issued Jun. 30, 1993, 45 pgs.
SAE International Surface Vehicle Recommended Practice, OBD II Scan Tool, SAE Standard J1978, Issued Mar. 1992, 13 pgs.
Surface Vehicle Recommended Practice; OBD II Scan Tool, Mar. 1992, 14 pgs.
SAE International Surface Vehicle Recommended Practice, E/E Diagnostic Test Modes, SAE Standard J1979, Issued Dec. 1991, 19 pgs.
Surface Vehicle Recommended Practice, E/E Diagnostic Test Modes, Dec. 1991, 32 pgs.

* cited by examiner

SYSTEMS AND METHODS FOR DYNAMIC TELEMATICS MESSAGING

CROSS-REFERENCE TO RELATED APPLICATIONS

The current application is a continuation of U.S. patent application Ser. No. 16/883,648, entitled "Systems and Methods for Dynamic Telematics Messaging" to Santhosh Srinivasulu, filed May 26, 2020, which issued as U.S. Pat. No. 11,290,556 on Mar. 29, 2022, which is a continuation of U.S. patent application Ser. No. 15/818,260, entitled "Systems and Methods for Dynamic Telematics Messaging" to Santhosh Srinivasulu, filed Nov. 20, 2017, which claims priority to U.S. Provisional Patent Application No. 62/582,192, filed Nov. 6, 2017, the disclosures of which are incorporated herein by reference in their entireties.

FIELD OF THE INVENTION

The present invention relates to system communication processing and more specifically to dynamically processing disparate messages.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, vehicle location determination, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for dynamic telematics messaging in accordance with embodiments of the invention are disclosed. One embodiment includes a dynamic telematics messaging system includes at least one vehicle telematics device, and a dynamic telematics messaging server system including, at least one processor, and a memory containing a messaging application, wherein the messaging application directs the at least one processor to obtain a first message data from the at least one vehicle telematics device encoded in a first message format, transcode the first message data into a second message format, process the transcoded message data, and provide the transcoded message data.

In another embodiment, transcoding the first message data into a second message format includes classifying the first message data by identifying the first message format.

In a further embodiment, classifying the first message data includes locating a header searching the first message data for at least one identifier and decoding the at least one identifier.

In still another embodiment, the at least one identifier is selected from the group consisting of a vehicle telematics device serial number, a vehicle identification number, an event code pattern, message data size, a unique accumulator value, and an IP address.

In a still further embodiment, decoding the at least one identifier includes matching the identifier to a messaging profile.

In yet another embodiment, decoding the at least one identifier includes matching the identifier to a messaging profile.

In a yet further embodiment, the appropriate module is a sensor data module, and the sensor data module directs the processor to determine available sensor data in the transcoded message and compile dynamic message data by aggregating the available sensor data into the second message format.

In another additional embodiment, the second message format is a standardized message format and aggregating the available sensor data includes populating standardized fields associated with the available sensor data.

In a further additional embodiment, the sensor data module further directs the processor to convert units associated with the available sensor data to standard units.

In another embodiment again, the sensor data module further directs the processor to generate secondary data based on the available sensor data.

In a further embodiment again, the appropriate module is a reverse geocoding module, and the reverse geocoding module directs the processor to obtain location data from the first message data, determine the nearest address based on the location data, and provide the determined address.

In still yet another embodiment, the location data includes GPS data.

In a still yet further embodiment, a method for dynamics telematics messaging includes obtaining a first message data from the at least one vehicle telematics device encoded in a first message format, transcoding the first message data into a second message format, processing the transcoded message data, and providing the transcoded message data.

In still another additional embodiment, transcoding the first message data into a second message format includes classifying the first message data by identifying the first message format.

In a still further additional embodiment, classifying the first message data includes locating a header, searching the first message data for at least one identifier, and decoding the at least one identifier.

In still another embodiment again, the at least one identifier is selected from the group consisting of a vehicle telematics device serial number, a vehicle identification number, an event code pattern, message data size, a unique accumulator value, and an IP address.

In a still further embodiment again, processing the transcoded message data includes applying an appropriate processing module to the transcoded message data.

In yet another additional embodiment, the appropriate module is a sensor data module, and the method further includes determining available sensor data in the transcoded message and compiling dynamic message data by aggregating the available sensor data into the second message format.

In a yet further additional embodiment, the second message format is a standardized message format, and aggregating the available sensor data includes populating standardized fields associated with the available sensor data.

In yet another embodiment again, the appropriate module is a reverse geocoding module, and the method further includes obtaining location data from the first message data, determining the nearest address based on the location data, and providing the determined address.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the prepended claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Figure 1A:
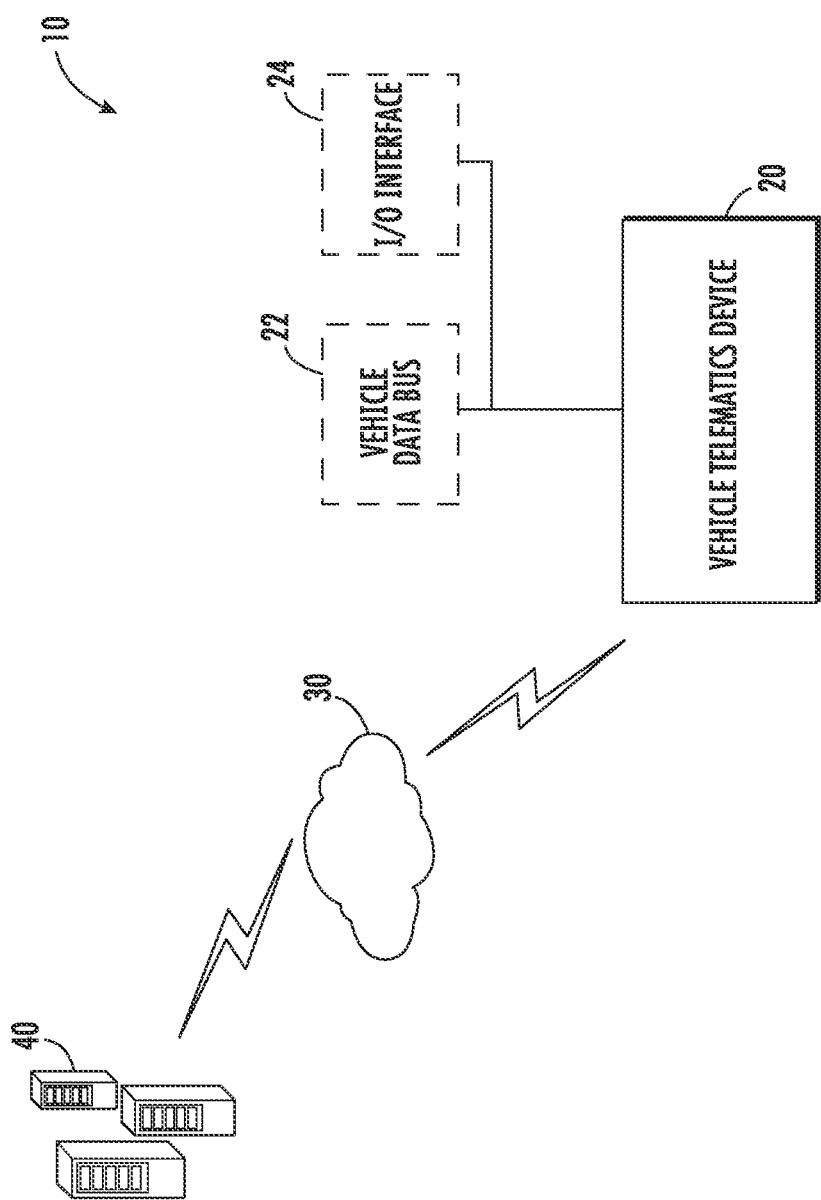
FIG. 1A is a conceptual illustration of a dynamic telematics messaging system in accordance with an embodiment of the invention.

Turning now to the drawings, systems and methods for dynamic telematics messaging in accordance with embodiments of the invention are disclosed. Fleets of vehicles are a core component of many industries such as logistics and personal transportation. In many cases, it can be beneficial to be able to monitor and track the status of vehicles within the fleet. As such, many vehicles are equipped with a vehicle telematics device. These vehicle telematics devices can obtain and/or measure a variety of data regarding the conditions and/or location of the vehicle along with receiving and transmitting data to remote server systems. In many designs, in order to facilitate the transmission and receiving of data to remote server systems, the data is formatted such that it can be understood and processed by the remote server system. However, traditional telematics messaging systems are static in nature, meaning that once they have been established, a great deal of work is typically needed to add or adjust any features, such as, but not limited to, message content and/or message structure. This work can potentially include a re-writing of the program source code of the telematics messaging system and/or updating the firmware of the vehicle telematics devices to conform to the new message formats.

Dynamic telematics messaging systems can be used to obtain and transcode messages from a wide variety of vehicle telematics devices to a standardized format. Further, dynamic telematics messaging systems can generate additional data based on received messages. For example, vehicle telematics devices may not have the capability to measure fuel efficiency, while a dynamic telematics messaging system can automatically calculate fuel efficiency based on other metrics received. In numerous embodiments, different modules can be implemented within dynamic telematics messaging systems to perform different data transformations. In many embodiments, modules are processes for processing message data. Dynamic telematics messaging systems can additionally be used to communicate with a variety of types of vehicle telematics devices using only a single gateway rather than an individual gateway for each type or variation of vehicle telematics device.

Dynamic telematics messaging systems offer an improvement over previous messaging systems in a number of ways that include, but are not limited to, allowing the automatic processing of a wide variety of messages which previously could not be processed using a single system. In many embodiments, dynamic telematics messaging systems improve the ability of the system to dynamically identify and process message data over the prior systems. In several embodiments, dynamic telematics messaging systems transcode messages when received messages have an absence of (or insufficient) identifying metadata. For example, many vehicle telematics devices may not include firmware version numbers, message format indicators, or any other identifier as appropriate to the requirements of a given application. In numerous embodiments, if received messages include some form of an identifier (e.g. a serial number, a vehicle identification number (VIN), user defined identifier, Internet Protocol (IP) address, etc.), but the identifier is insufficient to confirm the type of message, dynamic telematics messaging systems can perform processes to supplement the identification metadata. As such, dynamic telematics messaging systems can identify the type of message by analyzing message format. Consequently, vehicle telematics devices operating using legacy message formats can remain in use in the field while being interoperable with the dynamic telematics messaging system.

Dynamic Telematics Messaging Systems

Dynamic telematics messaging systems in accordance with embodiments of the invention can transmit a variety of data between a remote server system and vehicle telematics devices. A conceptual diagram of a dynamic telematics messaging system in accordance with an embodiment of the invention is shown in FIG. 1A. The dynamic telematics messaging system 10 includes a vehicle telematics device 20 that can communicate with a vehicle data bus 22, an input/output (I/O) interface 24, and/or a network 30 as appropriate to the requirements of specific applications of embodiments of the invention. In a variety of embodiments, vehicle telematics device 20 communicates with a dynamic messaging server system 40 via the network 30. In a variety of embodiments, the network 30 is the Internet. In many embodiments, the network 30 is any wired or wireless network, such as a cellular network or the Internet, between the vehicle telematics device 20 and the dynamic messaging server system 40. In a number of embodiments, the dynamic messaging server system 40 implemented using a single server system. In several embodiments, the dynamic messaging server system 40 is implemented using multiple server systems.

In a variety of embodiments, the vehicle telematics device 20 is installed in a vehicle having a vehicle data bus 22. In several embodiments, the vehicle telematics device 20 is connected to a vehicle diagnostic connector that provides access to the vehicle data bus 22. The vehicle telematics device 20 can obtain data from any of a variety of vehicle devices connected to the vehicle data bus 22 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the vehicle telematics device is connected directly, either wired or wirelessly, to one or more sensors within the vehicle and/or does not utilize the vehicle data bus 22. The vehicle telematics device 20 can include any of a variety of sensors and/or devices, including those described above with respect to the vehicle data bus and any described in more detail below, to obtain data regarding the status of the vehicle. The vehicle telematics device 20 can also communicate with any of a variety of sensors and/or devices using the I/O interface 24. The I/O interface 24 can be any connection, including wired and wireless connections, as appropriate to the requirements of specific applications of embodiments of the invention.

In several embodiments, the vehicle telematics device 20 is capable of executing scripts to read data and/or perform particular processes. These scripts can be pre-loaded on the device and/or obtained from the dynamic messaging server system 40, vehicle data bus 22, and/or the I/O interface 24 as appropriate to the requirements of specific applications of embodiments of the invention. The vehicle telematics device 20 can be self-powered and/or connected into the electrical system of the vehicle in which the vehicle telematics device 20 is installed. In a variety of embodiments, the vehicle telematics device is powered via the vehicle data bus 22 and/or the I/O interface 24. In many embodiments, the vehicle telematics device 20 utilizes a Global Positioning System (GPS) receiver in order to determine the location, speed, and/or acceleration of the vehicle. However, it should be noted that any location-determining techniques, such as cellular tower triangulation, wireless network geolocation techniques, and dead reckoning techniques, could be utilized as appropriate to the requirements of specific applications of embodiments of the invention.

In a variety of embodiments, the vehicle telematics device 20 and/or dynamic messaging server system 40 provides a user interface allowing for visualizing and interacting with the data transmitted and/or received between the systems. In several embodiments, the vehicle telematics device 20 and/or dynamic messaging server system 40 provide an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Figure 1B:
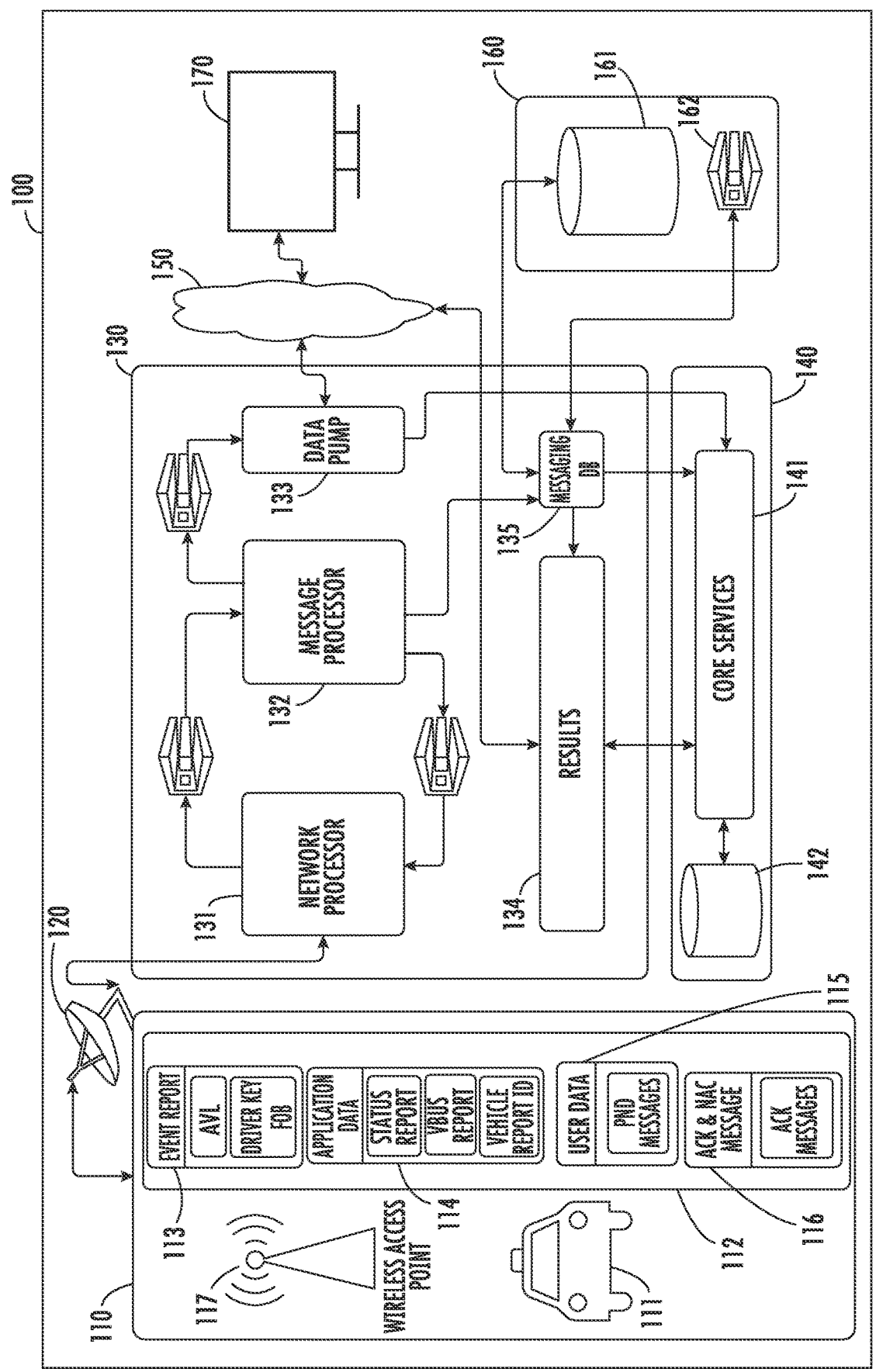
FIG. 1B is a second conceptual illustration of a dynamic telematics messaging system in accordance with an embodiment of the invention.

Turning now to FIG. 1B, a conceptual illustration of a dynamic telematics messaging system in accordance with an embodiment of the invention is shown. Dynamic telematics messaging system 100 receives messages from vehicle telematics devices 110. Vehicle telematics device 110 can be connected to a vehicle 111. In a variety of embodiments, vehicle telematics devices can be directly connected to a vehicle bus via a diagnostic connector within the vehicle. However, many vehicle telematics devices are not connected to the vehicle bus, and collect data independently and/or through direct connections to the vehicle's information systems. vehicle telematics devices are configured to obtain and generate data regarding the operation of the vehicle, including event data 113, application data 114, user data 115, and/or acknowledgement data 116. Event data can describe automatic vehicle location data (e.g. GPS coordinates), key fob presence, collision data, or any other event related information as appropriate to the requirements of a given application. Application data can describe any data utilized for management of the vehicle telematics device and/or any status related data, such as, but not limited to, data received from the vehicle BUS, report identification numbers, or any other data as appropriate to the requirements of a given application. User data can be any type of data describing the vehicle user and/or user action, such as, but not limited to, personal navigation data. Acknowledgement data can describe whether or not previous messages from and/or to the vehicle telematics device have been acknowledged by corresponding systems.

In a variety of embodiments, a wireless access point 117 contains components similar to vehicle telematics devices. In many embodiments, wireless access points can accumulate data and perform similar processes as vehicle telematics devices. In numerous embodiments, vehicle telematics devices transmit data using the wireless access point. In a variety of embodiments, the wireless access point is cell phone, a modem, a router, or any other wireless communications device as appropriate to the requirements of a given application. Systems and methods for transmitting data using a wireless access point that can be utilized in accordance with embodiments of the invention are described in U.S. patent application Ser. No. 15/430,400 titled "Systems and Methods for Radio Access Interfaces" filed Feb. 10, 2017, and U.S. patent application Ser. No. 15/373,277 titled "Systems and Methods for Tracking Multiple Collocated Assets" filed Dec. 8, 2016, the disclosures of which are incorporated herein by reference in their entirety. Data can be transferred over a wireless communications network 120 to a dynamic messaging server system 130. Messages transmitted to the dynamic messaging server system are obtained by a network processor 131 and stored in a queue to be processed by message processor 132. In many embodiments, message processors transcode received messages into a standardized message format. In numerous embodiments, message processors generate messages for transmission to vehicle telematics devices. As such, message processor 132 can be configured to store generated messages in a queue for transmission by the network processor 131 over the wireless communications network 120 back to vehicle telematics device 110.

Message processor 132 can further queue messages to be sent to data pump 133. Data pump 133 can be used to transmit messages between dynamic messaging server systems and user interface systems 170 via a network 150, such as the Internet. In many embodiments, the network 150 is configured to transmit messages using the hypertext transfer protocol using representational state transfer methods. However, any network protocol can be used to transmit data over the network as appropriate to the requirements of a given application.

The message processor 132 can further transmit messages to a message database 135. In numerous embodiments, message databases store standardized messages as records. In many embodiments, messages of various formats can be stored within message databases. The message database can be queried by a services module 140. Service modules comprise a set of core services 141, such as, but not limited to, applications that can process messages to produce meaningful data. Examples of core services include, but are not limited to, tracking a particular vehicle/set of vehicles, insurance claim data generation, route optimization, efficiency calculations, geofencing, or any other service as appropriate to the requirements of a given application. Core services can obtain service requests from interface systems 170, which can be passed through dynamic messaging server systems to the services module. Results can be generated and transmitted back via a similar route. In numerous embodiments, dynamic messaging server systems can generate a set of results to specific queries in addition to, or instead of, the services module. In many embodiments, service modules have databases 142 for storing data relevant to implementing various core services, including, but not limited to, relevant message records.

In numerous embodiments, storage module 160 can be connected to the message database 135 to store messages. Storage module 160 can include a storage database implemented using disk storage (disk database) 161 and/or a storage database implemented on main memory (in-memory database) 162. In numerous embodiments, the disk database is implemented using MongoDB. In a variety of embodiments, the in-memory database is implemented using Redis. However, any number of database implementations can be used in accordance with the requirements of a given application.

Although specific architectures of dynamic telematics messaging systems in accordance with embodiments of the invention are discussed above and illustrated in FIG. 1A-B, a variety of architectures, including sensors, servers, and other message data processing devices and techniques not specifically described above, can be utilized in accordance with embodiments of the invention. Furthermore, the processes described herein can be performed using any combination the vehicle telematics devices, server systems, and/or modules as appropriate to the requirements of specific applications of embodiments of the invention.

Vehicle Telematics Devices

Figure 2A:
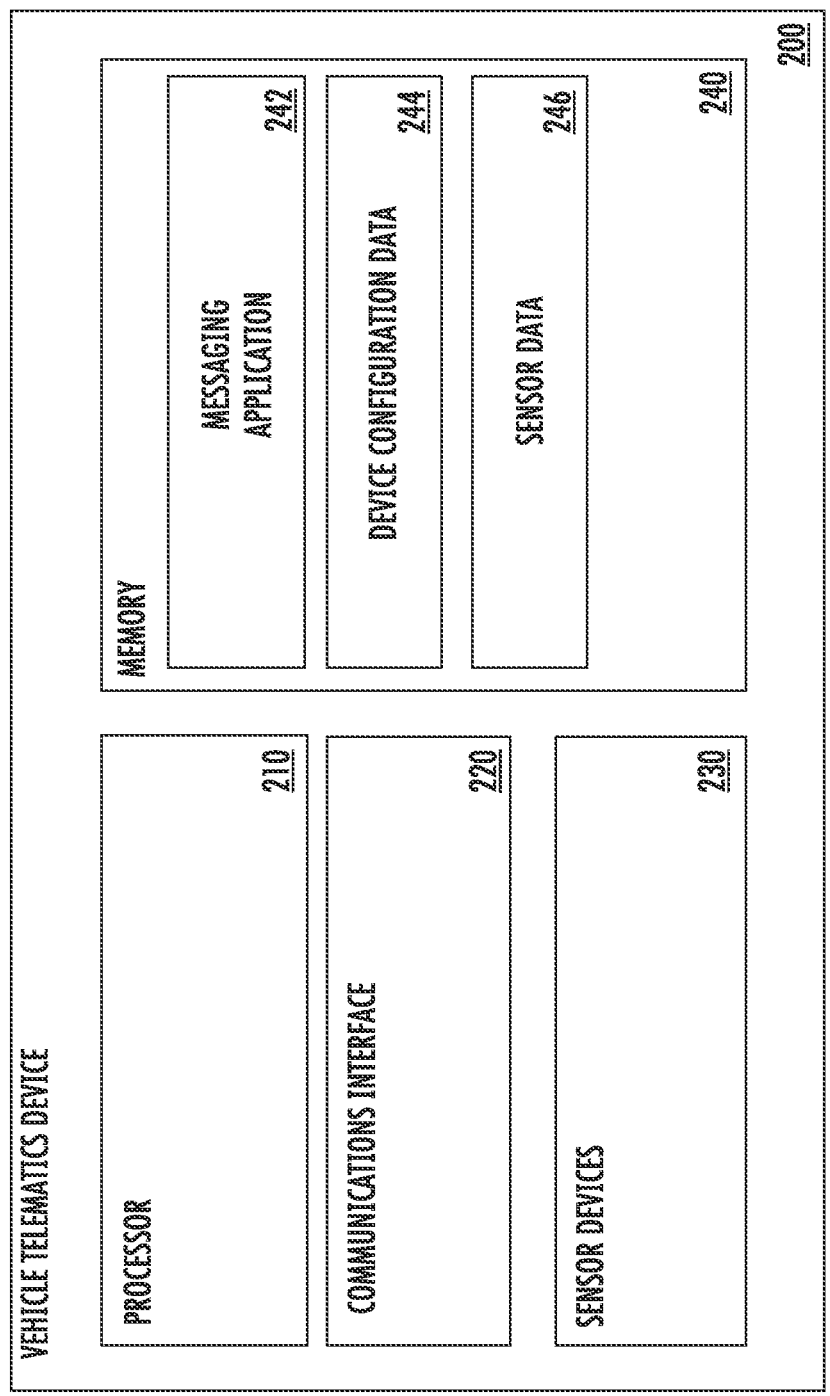
FIG. 2A is a conceptual illustration of a vehicle telematics device in accordance with an embodiment of the invention.

Vehicle telematics devices in accordance with many embodiments of the invention can transmit and receive data via dynamic telematics messaging systems. A conceptual illustration of a vehicle telematics device in accordance with an embodiment of the invention is shown in FIG. 2A. The vehicle telematics device 200 includes a processor 210 in communication with a memory 240. In many embodiments, memory includes a series of accumulators configured to store bit strings. Accumulators can be assigned static identifiers, e.g. 0, 1, 2 ... etc. The vehicle telematics device 200 includes a communications interface 220 capable of sending and receiving data. Although the processor 210 and communications interface 220 are illustrated as separate components, some or all of these devices can be implemented using a single-chip solution as appropriate to the requirements of specific applications of embodiments of the invention.

In certain embodiments, sensor devices 230 can be included within the vehicle telematics device 200 and/or located external to the vehicle telematics device 200. Sensor devices 230 can include, but are not limited to, RPM sensors, voltage sensors, GPS receivers, noise sensors, vibration sensors, acceleration sensors, weight sensors, and any other device capable of measuring data regarding a vehicle as appropriate to the requirements of specific applications of embodiments of the invention. Sensor devices 230 can further include any sensor readings produced by sensors integrated into the vehicle, and transmitted to the vehicle telematics device. In many embodiments, sensor readings produced by sensors integrated into the vehicle and transmitted over the vehicle bus. In numerous embodiments, sensor readings are stored in the series of accumulators.

In several embodiments, the memory 240 is any form of storage configured to store a variety of data, including, but not limited to, a messaging application 242, device configuration data 244, and sensor data 246. In many embodiments, the messaging application 242, configuration data 244, and/or sensor data 246 are stored using an external server system and received by the vehicle telematics device 200 using the communications interface 220. Sensor data 246 can include any measurements taken by sensor devices. In numerous embodiments, sensor data is stored in accumulators. Sensor data can also include location data generated using a variety of methods including, but not limited to, utilizing GPS, cellular tower triangulation, wireless network geolocation techniques, dead reckoning techniques, and/or any other geolocation measurement system as appropriate to the requirements of a given application.

Figure 2B:
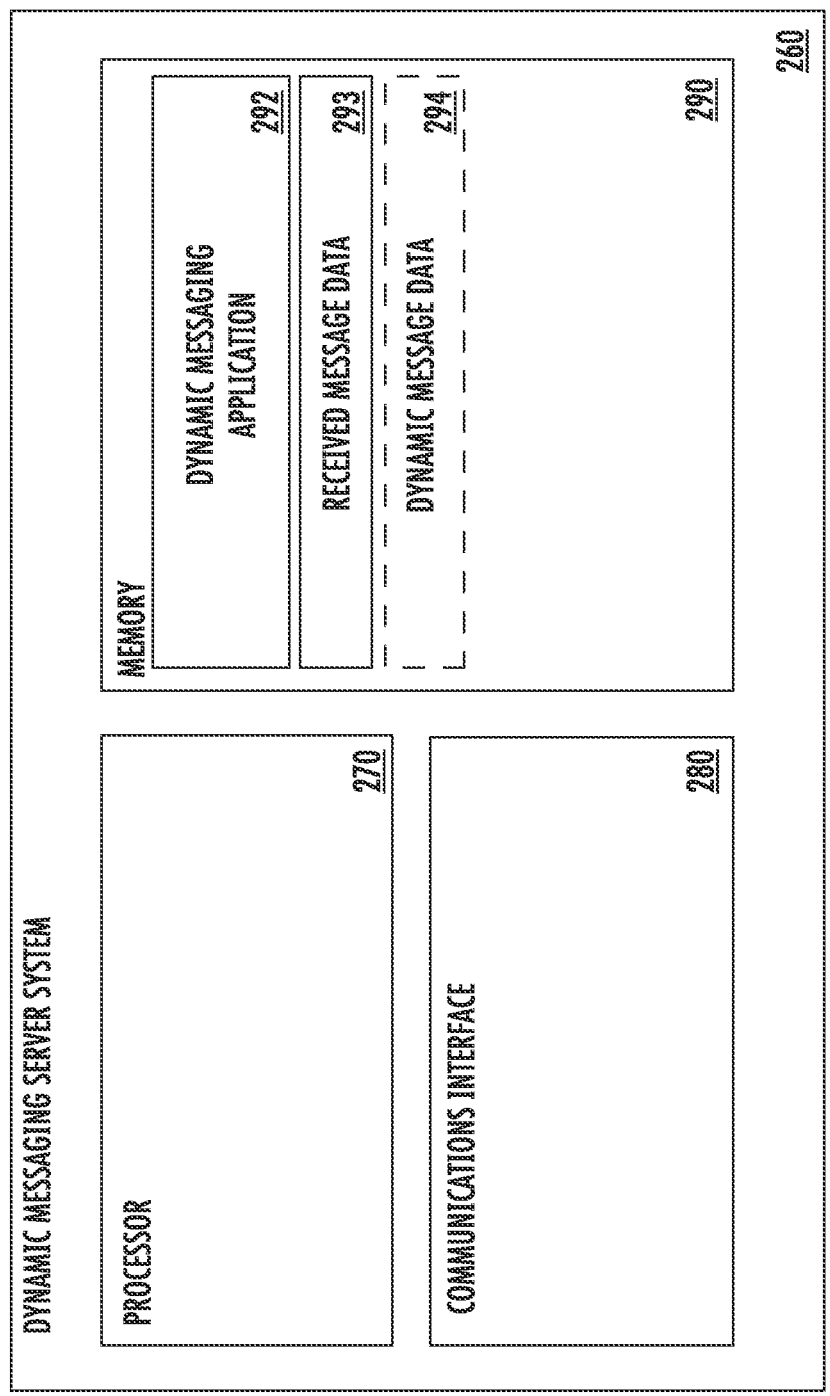
FIG. 2B is a conceptual illustration of a dynamic messaging server in accordance with an embodiment of the invention.

Turning now to FIG. 2B, a conceptual illustration of a dynamic messaging server system is shown. The dynamic messaging server system 260 includes a processor 270 in communication with a memory 290 and a communications interface 280. Processor 270 can be any type of computational processing unit, including, but not limited to, microprocessors, central processing units, graphical processing units, parallel processing engines, or any other type of processor as appropriate to the requirements of a given application. Memory 290 can be implemented using any combination of volatile and/or non-volatile memory, including, but not limited to, random access memory, read-only memory, hard disk drives, solid-state drives, flash memory, or any other memory format as appropriate to the requirements of a given application. The communications interface 280 can be utilized to transmit and receive messages from any of a variety of remote systems, such as vehicle telematics and remote server systems. Communications interfaces can include multiple ports and/or technologies in order to communicate with various devices as appropriate to the requirements of specific applications of embodiments of the invention as described above.

In several embodiments, the memory 290 is any form of storage configured to store a variety of data, including, but not limited to, a dynamic messaging application 292, received message data 293, and/or dynamic message data 294. In many embodiments, the dynamic messaging application 292, received message data 293, and/or dynamic message data 294 are stored using an external server system and received by the dynamic messaging server system 260 using the communications interface 280.

The processor 210 and the processor 270 can be directed, by messaging application 242 and dynamic messaging application 292 respectively, to perform a variety of dynamic telematics messaging processes. A number of dynamic telematics messaging processes in accordance with embodiments of the invention are described in more detail below.

Although specific architectures for vehicle telematics devices and dynamic messaging server systems in accordance with embodiments of the invention are conceptually illustrated in FIGS. 2A and 2B, any of a variety of architectures, including those that store data or applications on disk or some other form of storage and are loaded into memory at runtime, can also be utilized. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices such as, but not limited to, systems-on-a-chip (SoC). Furthermore, dynamic messaging servers can be implemented on multiple servers within at least one server system. For example, dynamic messaging server systems can be implemented on various remote "cloud" server systems as appropriate to the requirements of a given application.

Dynamic Telematics Messaging

Vehicle telematics devices across a fleet of vehicles are often different models and/or operate using different messaging schemes. Dynamic telematics messaging systems can be used to harmonize the content and structure of messages received from different telematics units. In many embodiments, message data received from at least one vehicle telematics device in the fleet is not self-descriptive. That is, the message data does not identify what the data represents. In many embodiments, messages contain bit strings from accumulator registers and/or event codes from the originating vehicle telematics device. In some embodiments, event codes can be associated with accumulator register data. For example, event codes can be, but are not limited to, elapsed time, distance traveled, speed, maximum speed achieved, current acceleration/deceleration output, maximum acceleration/deceleration output, zone states, position accuracy estimates, input/output states, maximum acceleration and/or deceleration, received signal strength indication, communications network identification numbers, temperature, speed history, throttle position engine speed, odometer, fuel remaining, current gear, coolant temperature, fuel consumption rate, battery voltage, service interval inspection distance, oil temperature, or any other metric associated with the vehicle that the vehicle telematics device is attached to. The above list is not meant to be exhaustive, and one of ordinary skill in the art would recognize that any number of metrics can be associated with a vehicle.

Further, vehicle telematics devices can have multiple messaging profile types such that generated messages can have various orderings of data. In numerous embodiments, event codes are not all unique identifiers and/or do not expressly indicate the type of associate data. Despite receiving sparsely labeled and/or unlabeled data, Dynamic telematics messaging processes in accordance with embodiments of the invention can include harmonizing numerous different messages, in a variety of formats, from different vehicle telematics devices to a single messaging format.

Figure 3A:
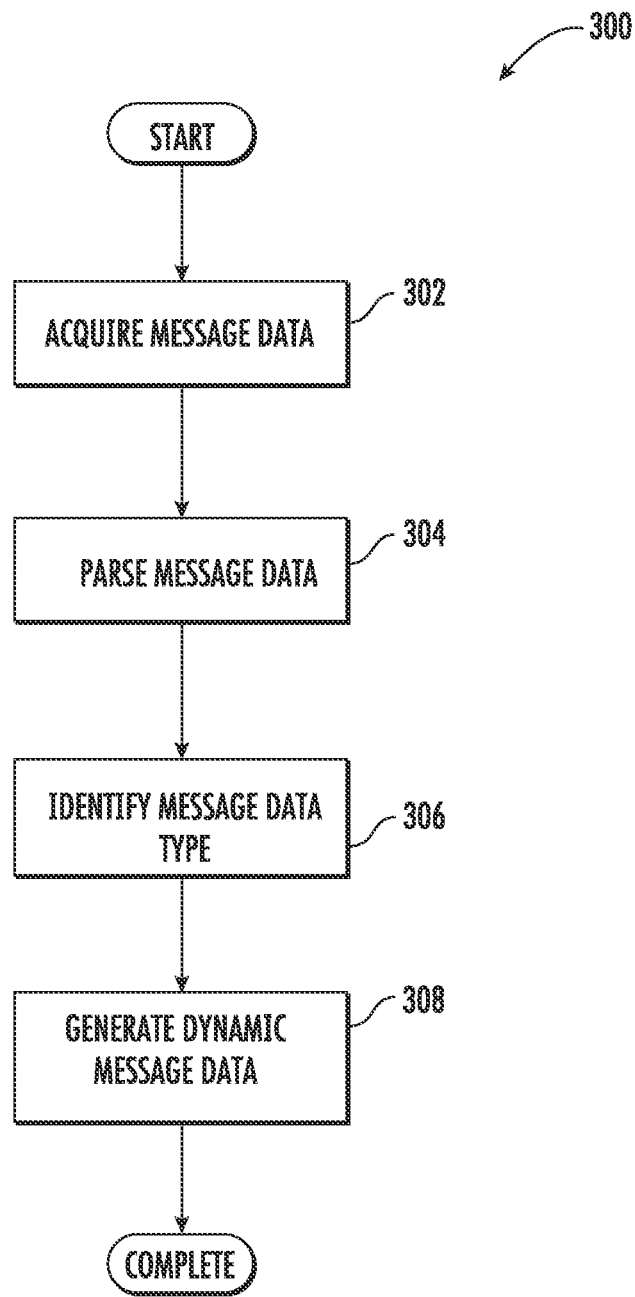
FIG. 3A is a flow chart illustrating a process for generating dynamic message data in accordance with an embodiment of the invention.

Turning now to FIG. 3A, a process for generating dynamic message data in accordance with an embodiment of the invention is illustrated. Process 300 includes acquiring (302) message data and parsing (304) message data. Message data can be comprised of at least byte message data and metadata. Byte message data can include vehicle telematics device accumulator values, event type codes, or any other substantive information from a vehicle telematics device as appropriate to the requirements of a given application of the invention. Metadata can describe the various pieces of information about the byte message. In numerous embodiments, message data received are already contain dynamic message data. In many embodiments, if dynamic message data is received, then no further parsing steps are required. If the data received is an unlabeled message data, the message can be parsed to identify and/or label the unlabeled message data.

In numerous embodiments, parsing the message data involves analyzing the structure of the message data. In a variety of embodiments, parsing the message involves analyzing the content of the message. The message type is identified (306) and dynamic message data are generated (308). In numerous embodiments, dynamic message data is a standardized message format that labels each type of data contained in a received message data using a unique identifier. In some embodiments, the dynamic message data contains a field for each possible type of data receivable in a vehicle telematics device message. In a variety of embodiments, the dynamic message data only contains a field for the types of data received in the received vehicle telematics device message. However, any subset of the set of possible types of data can be used as a field in a dynamic message data in accordance with the requirements of a given application.

Figure 3B:
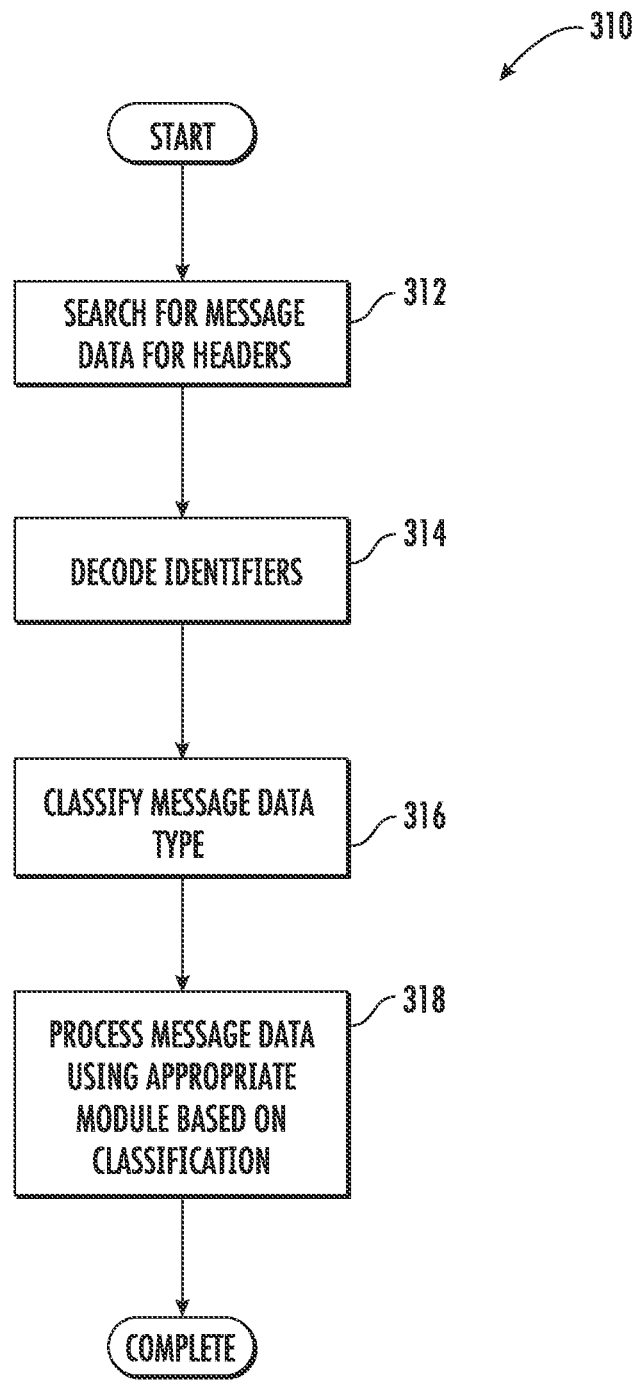
FIG. 3B is a flow chart illustrating a process for directing messages to appropriate modules in accordance with an embodiment of the invention.

In many embodiments, dynamic messaging processes include parsing messages data. Parsing message data can include reading the content and/or structure of received message data and determining one or more processing modules to be used to transcode the message data to a standard format. Turning now to FIG. 3B, a process for directing message data to the appropriate module in accordance with an embodiment of the invention is illustrated. Process 310 includes searching (312) message data for headers. In numerous embodiments, headers are stored within the metadata corresponding to message data and/or generated when the message is initially received. Headers can indicate a source address, a source port, a protocol identifier, a message length, and/or any other metadata describing the message as appropriate to the requirements of embodiments of the invention. In many embodiments, not all messages have headers. In numerous embodiments, different message data have different amounts and/or types of metadata stored in headers. In a variety of embodiments, the headers can be updated headers with flags (or any other metadata) as it is processed.

Process 310 further includes decoding (314) identifiers. In numerous embodiments, identifiers can be headers. For example, in a variety of embodiments, identifiers can be part of the byte message data. Identifiers can include patterns of event codes that are unique to particular messaging profiles. Identifiers can also include accumulator values that are unique to specific event types. In many embodiments, identifiers can be extracted from a combination of byte message data and headers. For example, message size in addition to an event code location in the bit message can indicate the source vehicle telematics device type and/or messaging profile used to generate the message data. However, any combination of data can be used as an identifier as appropriate to the requirements of specific applications of embodiments of the invention.

Identifiers can be used to classify (316) message data types. In many embodiments, identifiers are matched against a database of identifiers associated with message data types. In several embodiments, message data types are messaging profiles that describe the labels for the data in a particular message data format. Multiple messaging profiles can be associated with the same vehicle telematics device type. Message data types can include, but are not limited to, messages regarding event reporting, vehicle telematics device identification, user data, application data, configuration settings, data requests, location reports, accumulator logs, collision reports, acknowledged status, not acknowledged status, and/or any other messaging type as appropriate to the requirements of a given application. In numerous embodiments, a single message can contain data associated with more than one type. In a variety of embodiments, if no type can be determined, the message data can be placed in a queue for unrecognized messages. Unrecognized messages can be flagged for manual processing, and/or stored in a log file associated with the vehicle telematics device.

Once the vehicle telematics device message type is identified, the message data, in whole or in part, can be processed (318) based on the identified classification. In many embodiments, each messaging type is parsed differently based on the message data type. In numerous embodiments, message data are labeled according to a set of rules for the particular processing stream. In the event that message data is unable to be fully parsed, all or part of the message can be flagged and/or stored in the log file associated with the vehicle telematics device.

While a variety of methods for generating and parsing message data are described above with respect to FIGS. 3A and 3B, one of ordinary skill in the art would appreciate that any number of parsing methods could be used in accordance with the requirements of a given application of the invention.

Processing Messages Using Dynamic Telematics Messaging Systems

Figure 4:
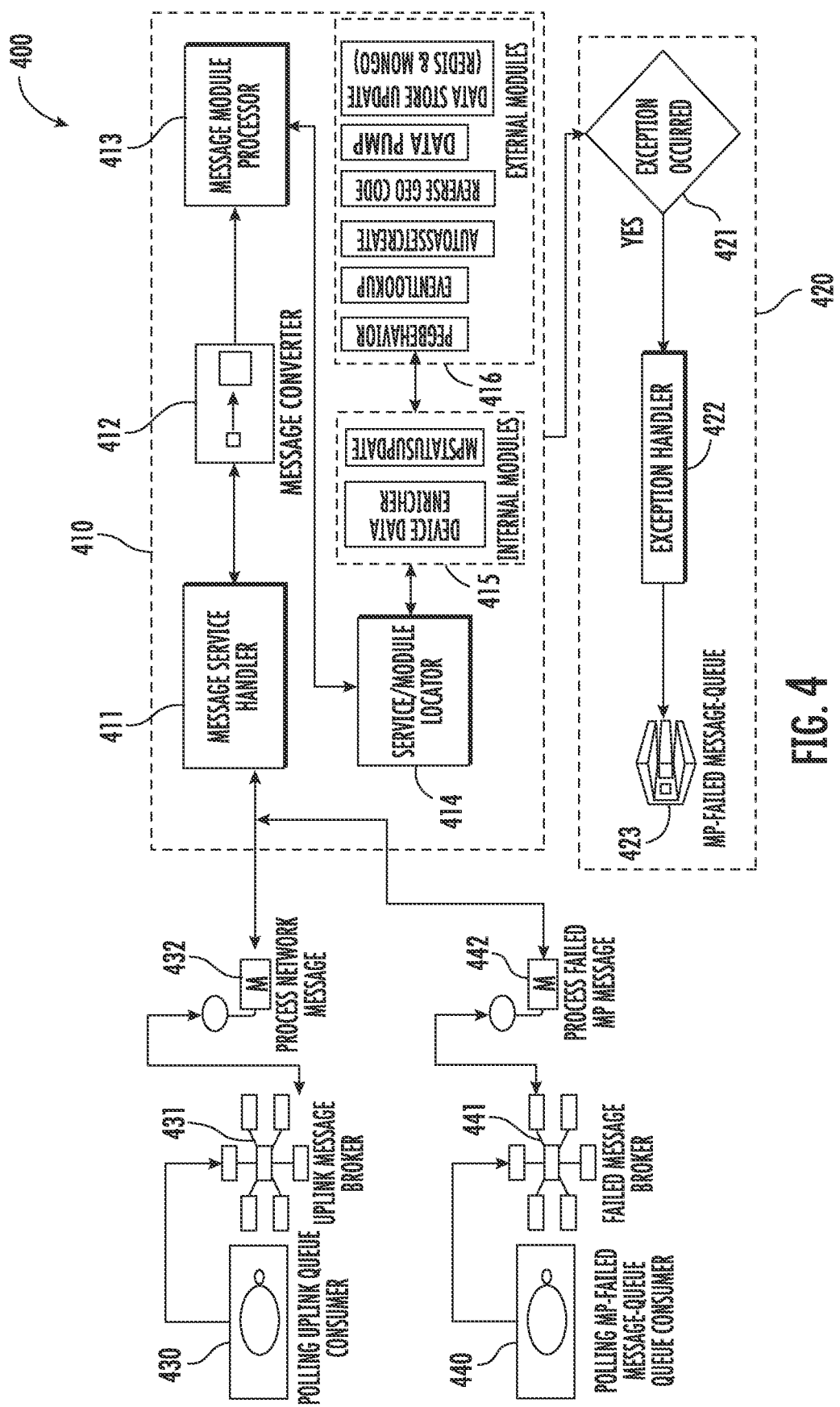
FIG. 4 is a flow diagram illustrating an implementation of a process for generating dynamic message data in accordance with an embodiment of the invention.

Dynamic telematics messaging processes in accordance with embodiments of the invention can include generating dynamic messaging data based on received. Turning now to FIG. 4, a conceptual illustration of a processor for generating dynamic message data in accordance with an embodiment of the invention is shown. The processor 400 includes incoming messages that interface with a message processor 410. In many embodiments, an uplink message consumer 430 interfaces with an uplink message broker 431 to generate and/or receive a network message 432 that is sent to or received from the message processor 410. The message processor 410 includes a message service handler 411, a message converter 412, message module processor 413, and service/module locater 414. The message processor 410 can also include internal modules 415 and/or external modules 416. Exception handling systems 420 may include generated exception data 421, an exception handler 422 and a failed message queue 423. The failed message queue may then be reprocessed by a failed message consumer 440, and failed message broker 441 to generate a failed message 442.

Incoming messages generated from application interface events can be acquired through an uplink message consumer 430. In many embodiments, the uplink message consumer is a polling consumer. In certain embodiments, received messages can be processed through an uplink message broker 431 to generate a network message 432 in a proper format for processing. In numerous embodiments, each message consumer includes an integrated exception handler to handle any exceptions that occur during processing.

The message processor 410 enriches incoming network messages 432. In several embodiments, the message processor 410 receives network messages 432 via the message service handler 411. In a variety of embodiments, the message service handler 411 measures the network message 432 for device configuration data that can be utilized to determine core services necessary for processing of the message 432. The message converter 412 converts the message from a network message 432 into event object data. In a number of embodiments, the event object data is in a self-described format. In a variety of embodiments, the message module processor 413 correlates event object data with subscription data to determine modules that can be utilized by the message processor 410 to process the event object data. The service/module locator 414 loads core services and modules based on the enriched event object data.

Modules can be stored internally 415 or externally 416 based on the needs of the application. Modules can be utilized based on a variety of factors including, but not limited to, configuration data, subscription data, the type of message, and/or the specific need of the application. For example, modules can be dynamically applied in dynamic telematics messaging systems based on the type of device that sent the message or by messages processed from a certain client. In many embodiments, a module for converting event object data into behavior data is utilized for further analysis and processing. Modules are dynamically applied to the message processor, thereby allowing for the creation of new modules as needed.

In several embodiments, each type of module 415, 416 handles its own exceptions through an exception handling process 420. When exceptions occur, exception data 421 can be generated. In a variety of embodiments, the exception data 421 is processed by an exception handler 422. In many embodiments, based on the rules of the exception handler 422, the event object is added to a failed message queue 423. A failed message consumer 440 receives the failed message from the failed message queue 423. In many embodiments, the failed message is processed by a failed message broker 441 to generate a failed message pass (MP) message 442 in a format suitable for processing by the message processor 410. In a variety of embodiments, the message service handler 411 receives the failed MP message 442 and only invokes the modules or services that generated the exception data from the previous message processing.

Specific structures for processing messages in accordance with embodiments of the invention are described above and shown with respect to FIG. 4. However, any number of structures, including those that utilize multiple or remotely accessed message consumers, modules, and/or core services can be utilized as appropriate to the requirements of specific applications in accordance with embodiments of the invention.

Generating Dynamic Message Data

Dynamic telematics messaging processes in accordance with embodiments of the invention can include generating dynamic message data. Dynamic message data can be generated by compiling parsed vehicle telematics device messages. In numerous embodiments, dynamic message data also includes new data generated by dynamic telematics messaging systems from parsed vehicle telematics device messages. In many embodiments, older vehicle telematics devices are not capable of producing the same types of data as newer vehicle telematics devices. However, some newer types of data can be calculated and/or approximated from older vehicle telematics device data types. In numerous embodiments, new data generate by dynamic telematics messaging systems incorporates data or processing capabilities not available to the vehicle telematics devices, such as, but not limited to, map data, impact detection processing, or any other calculation or data set as appropriate to the requirements of a given application.

Figure 5:
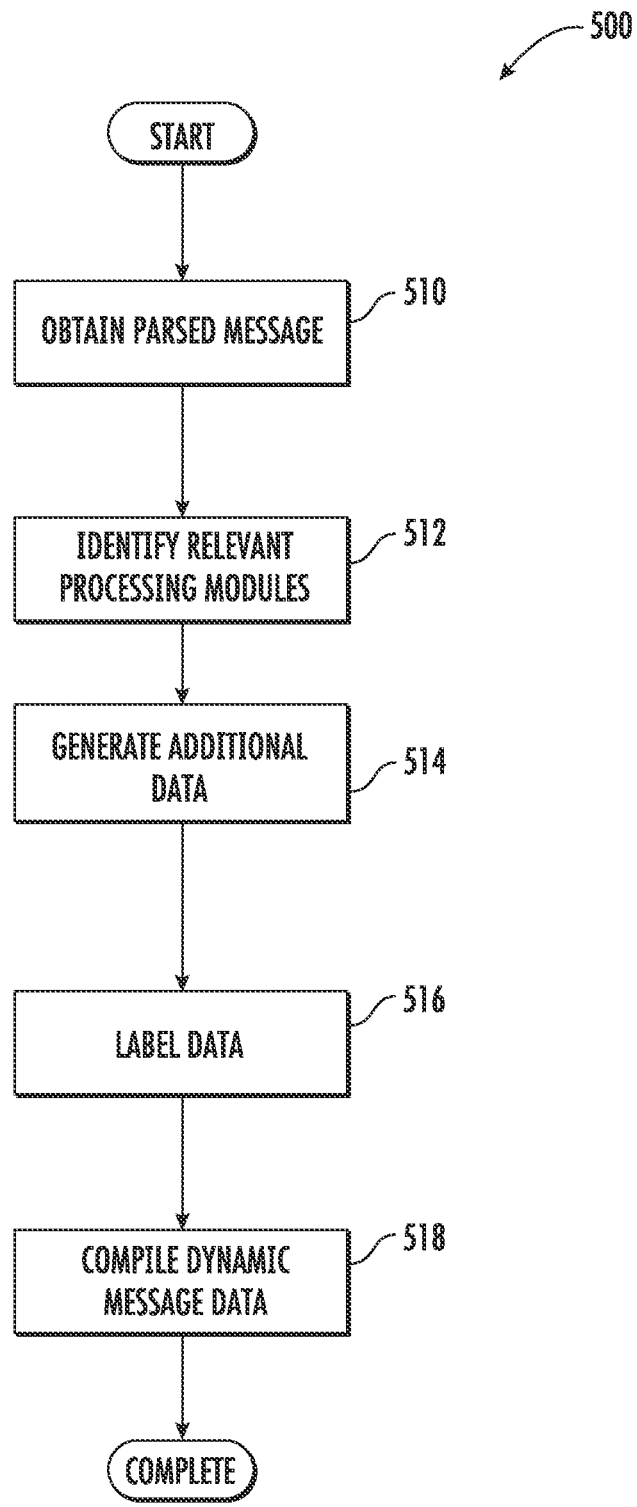
FIG. 5 is a flow chart illustrating a process for compiling dynamic message data in accordance with an embodiment of the invention.

Turning now to FIG. 5, a process for compiling parsed vehicle telematics device messages into dynamic message data in accordance with an embodiment of the invention is shown. Process 500 includes obtaining (510) parsed message data. In numerous embodiments, parsed message data includes event type and accumulator value pairs. Relevant processing modules can be identified (512). In a variety of embodiments, the processing modules are identified based on the parsed message data. In several embodiments, additional data can be generated (514). In many embodiments, the additional data is generated (514) by one or more processing modules. Processing modules can include calculations, data management capabilities, and/or data sets that can be used in conjunction with parsed message data. For example, GPS data (or other locational data) obtained in a vehicle telematics device message can be used to reverse geo code the street and/or nearby address location of a vehicle telematics device. By way of a second example, a remaining drive time can be calculated based on fuel level, elapsed time, and/or distance traveled. However, any number of calculations can be performed by modules to generate (514) additional data from received messages using modules as appropriate to the requirements of specific applications of embodiments of the invention.

Data, including parsed message data and/or additional data, can be labeled (516) and compiled (518) into dynamic message data. Labeling parsed message data can include, but is not limited to, adding appropriate units, adding additional metadata, or formatting the message data structure in such a way that the type of data is readily apparent. For example, the parsed message data can be labeled using a variety of extensible markup language (XML) tags, although any label metadata can be utilized as appropriate to the requirements of specific applications of embodiments of the invention.

Specific processes for generating additional data and/or labeling data in accordance with embodiments of the invention are described above and shown with respect to FIG. 5; however, any number of processes, including those that use alternative techniques for generating data and other message formats, such as JSON, can be utilized as appropriate to the requirements of a specific application in accordance with embodiments of the invention.

Processing Sensor Data

Figure 6:
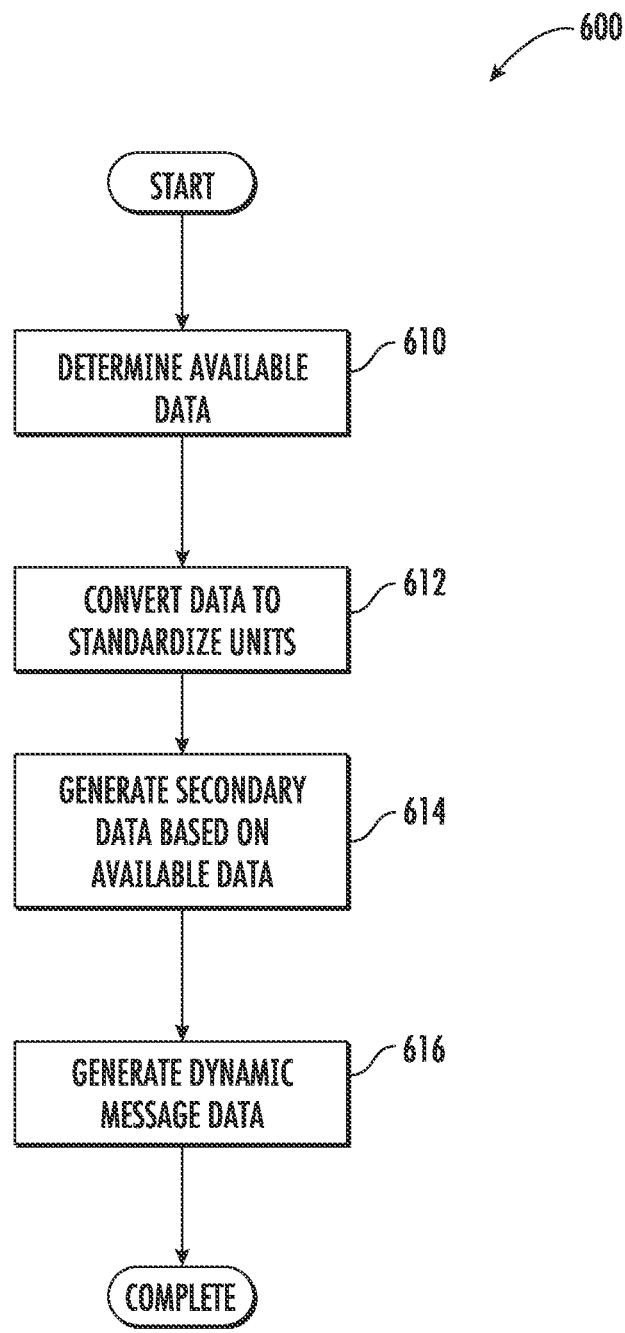
FIG. 6 is a flow chart illustrating a process for generating dynamic message data in accordance with an embodiment of the invention.

Sensor data can be stored within message data. Dynamic telematics messaging processes can include determining the kinds of sensor readings that are present within a given message and/or produce additional data based on received data to provide useful data. Turning now to FIG. 6, a process for generating dynamic message data in accordance with an embodiment of the invention is illustrated. Process 600 includes determining (610) available data from a message. In many embodiments, the type data is determined prior to initializing processing using the module. In numerous embodiments, a vehicle telematics device sensor data module determines the type of data contained within a message. Once the type of data is determined, the data can be converted (612) to standardized units. In numerous embodiments, measurements obtained by vehicle telematics device sensor devices are measured in imperial units. In a variety of embodiments, measurements described by sensor data are in metric units. However, any unit, including novel units can be used to label measured data and vehicle telematics device sensor data modules can be configured to and from any standardized unit format as appropriate to the requirements of specific applications of embodiments of the invention.

Process 600 can also include generating (614) secondary data based on the determined available data. In numerous embodiments, information regarding the vehicle and/or sensors that the vehicle telematics device that originated the message in installed and/or connected to can be utilized to identify secondary data. For example, the accumulator configuration for a particular device can be determined based on the vehicle identification number (VIN) for the vehicle; the accumulator configuration can be utilized to decode and process the message data received as described above. In numerous embodiments, a time to next vehicle service requirement can be calculated based on odometer readings and/or vehicle service history data. In a variety of embodiments, an estimated time to arrival at a destination can be calculated based on current time, the location of the vehicle, and the average speed of the vehicle. However, any number of different calculations, including alternate methods of calculating the same data, can be performed by vehicle telematics device sensor data modules as appropriate to the requirements of a given application of embodiments of the invention.

Process 600 also includes generating (616) dynamic message data by aggregating received data and generated secondary data into a standard dynamic message structure. In numerous embodiments, the standard dynamic message structure has standardized fields for different types of data. In many embodiments, the vehicle telematics device sensor data module provides the available data and the generated secondary data to the message processor to compile the dynamic message data.

Specific processes for generating dynamic messaging data in accordance with embodiments of the invention are described above and shown with respect to FIG. 6; however, any number of processes, including those that use alternative techniques for processing different types of sensor data, can be utilized as appropriate to the requirements of a specific application in accordance with embodiments of the invention.

Reverse Geocoding

Reverse geocoding is the process of determining a nearest address to a specific geographic coordinate. Message data can include location data describing where the message originated. In many embodiments, address based location information can be useful for asset tracking. In numerous embodiments, data such as GPS coordinates can be unreliable. For example, in areas with numerous obstacles (e.g. buildings in an urban setting), GPS data can be unreliable. Location data can include a variety of alternative location data such as, but not limited to, geolocation derived from IP addresses associated with wireless networks. Alternative location data can be used to augment other location data and/or to improve the process of locating the point of origin of the message data. Dynamics telematics messaging processes in accordance with embodiments of the invention can include automatically reverse geocoding location data to include location data in the dynamic message data.

Figure 7:
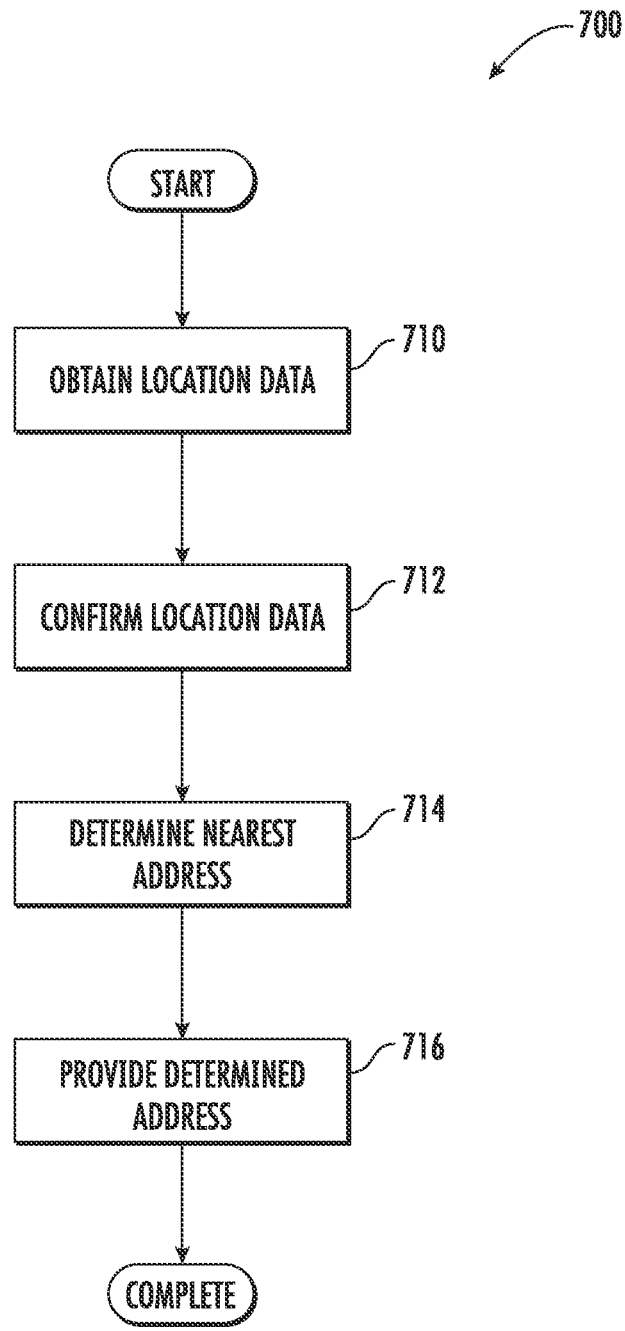
FIG. 7 is a flow chart illustrating a process for generating reverse geocoding message data in accordance with an embodiment of the invention.

Turning now to FIG. 7, a process for providing an address based on location data in accordance with an embodiment of the invention is illustrated. Process 700 includes obtaining (710) location data. In many embodiments, location data is confirmed (712). Location data can be confirmed in a variety of ways, including, but not limited to, performing sanity checks against previously reported locations, utilizing an alternate method of obtaining location, estimating the expected location based on historical speed and/or position data, and/or any other confirmation technique as appropriate to the requirements of a given application. Reverse geolocation techniques can be applied to the location data to determine (714) the nearest address. In many embodiments, location data is used to search a map for the nearest address. In numerous embodiments, the nearest address is a street address. In a variety of embodiments, the nearest address is a label that describes a specific geographic region (e.g. a Cartesian coordinate on a grid overlaid on a map, or any other labeling system appropriate to the requirements of a given application). The determined address can be provided (716). In many embodiments, the determined address is provided to an interface device, a message processor, and/or any other component as appropriate to the requirements of a given application.

Specific processes for reverse geocoding in accordance with embodiments of the invention are described above and shown with respect to FIG. 7; however, any number of processes, including those that use alternative techniques for reverse geocoding and/or different types of location data, can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

The invention claimed is:

1. A dynamic telematics messaging server system comprising:
    at least one processor; and
    a memory containing a messaging application, wherein the messaging application directs the at least one processor to:
        obtain a first message data from a vehicle telematics device;
        parse the first message data to generate parsed message data, wherein the parsed message data includes a plurality of event type and accumulator value pairs;
        classify the first message data to identify a type of message based on the parsed message data;
        identify an appropriate processing module of a plurality of processing modules based on the classification of the first message data, each processing module providing a different function for performing different data transformations;
        generate additional data by the identified appropriate processing module based on the parsed message data and a data transformation function association with the identified appropriate processing module; and
        compile the parsed message data and the additional data into dynamic message data, wherein the dynamic message data includes the parsed message data and the additional data.

2. The dynamic telematics messaging server system of claim 1, wherein to generate the additional data by the processing module comprises to calculate additional data based on the parsed message data by a calculation module.

3. The dynamic telematics messaging server system of claim 2, wherein to calculate the additional data comprises to calculate a remaining drive time based on a fuel level, an elapsed time, or a distance traveled.

4. The dynamic telematics messaging server system of claim 2, wherein to calculate the additional data comprises to perform impact detection processing.

5. The dynamic telematics messaging server system of claim 1, wherein to generate the additional data comprises to reverse geo code a nearby address location based on the parsed message data by a reverse geocoding module.

6. The dynamic telematics messaging server system of claim 1, wherein:
    the messaging application further directs the at least one processor to label the parsed message data or the additional data; and
    to compile the parsed message data and the additional data comprises to compile the parsed message data and the additional data in response to labeling of the parsed message data or the additional data.

7. The dynamic telematics messaging server system of claim 6, wherein to label the parsed message data or the additional data comprises to add a unit or to add additional metadata.

8. The dynamic telematics messaging server system of claim 1, wherein the dynamic message data comprises a self-descriptive format.

9. A method for dynamic telematics messaging, the method comprising:
    obtaining, by a server system, a first message data from a vehicle telematics device;
    parsing, by the server system, the first message data to generate parsed message data, wherein the parsed message data includes a plurality of event type and accumulator value pairs;
    classifying, by the server system, the first message data to identify a type of message based on the parsed message data;
    identifying, by the server system, an appropriate processing module of a plurality of processing modules based on classifying the first message data, each processing module providing a different function for performing different data transformations;
    generating, by the server system, additional data by the identified appropriate processing module based on the parsed message data and a data transformation function association with the identified appropriate processing module; and compiling, by the server system, the parsed message data and the additional data into dynamic message data, wherein the dynamic message data includes the parsed message data and the additional data.

10. The method of claim 9, wherein generating the additional data by the processing module comprises calculating additional data based on the parsed message data by a calculation module.

11. The method of claim 10, wherein calculating the additional data comprises calculating a remaining drive time based on a fuel level, an elapsed time, or a distance traveled.

12. The method of claim 10, wherein calculating the additional data comprises performing impact detection processing.

13. The method of claim 9, wherein generating the additional data comprises reverse geo coding a nearby address location based on the parsed message data by a reverse geocoding module.

14. The method of claim 9, further comprising:
labeling, by the server system, the parsed message data or the additional data;
wherein compiling the parsed message data and the additional data comprises compiling the parsed message data and the additional data in response to labeling the parsed message data or the additional data.

15. One or more non-transitory, computer-readable storage media comprising a plurality of instructions that in response to being executed cause a server system to:
obtain a first message data from a vehicle telematics device;
parse the first message data to generate parsed message data, wherein the parsed message data includes a plurality of event type and accumulator value pairs;
classify the first message data to identify a type of message based on the parsed message data;
identify an appropriate processing module of a plurality of processing modules based on classifying the first message data, each processing module providing a different function for performing different data transformations;
generate additional data by the identified appropriate processing module based on the parsed message data and a data transformation function association with the identified appropriate processing module; and
compile the parsed message data and the additional data into dynamic message data, wherein the dynamic message data includes the parsed message data and the additional data.

16. The one or more computer-readable storage media of claim 15, wherein to generate the additional data by the processing module comprises to calculate additional data based on the parsed message data by a calculation module.

17. The one or more computer-readable storage media of claim 16, wherein to calculate the additional data comprises to calculate a remaining drive time based on a fuel level, an elapsed time, or a distance traveled.

18. The one or more computer-readable storage media of claim 16, wherein to calculate the additional data comprises to perform impact detection processing.

19. The one or more computer-readable storage media of claim 15, wherein to generate the additional data comprises to reverse geo code a nearby address location based on the parsed message data by a reverse geocoding module.

20. The one or more computer-readable storage media of claim 15, further comprising a plurality of instructions that in response to being executed cause the server system to:
label the parsed message data or the additional data;
wherein to compile the parsed message data and the additional data comprises to compile the parsed message data and the additional data in response to labeling the parsed message data or the additional data.

* * * * *